(12) United States Patent
Purdy et al.

(10) Patent No.: US 11,319,479 B2
(45) Date of Patent: May 3, 2022

(54) ORGANIC ACID SYSTEMS

(71) Applicant: FLUID ENERGY GROUP LTD., Calgary (CA)

(72) Inventors: Clay Purdy, Medicine Hat (CA); Markus Weissenberger, Calgary (CA); Adrienne Lee, Calgary (CA)

(73) Assignee: FLUID ENERGY GROUP LTD., Calgary (CA)

( * ) Notice: Subject to any disclaimer, the term of this patent is extended or adjusted under 35 U.S.C. 154(b) by 0 days.

(21) Appl. No.: 16/814,415

(22) Filed: Mar. 10, 2020

(65) Prior Publication Data
US 2020/0291287 A1 Sep. 17, 2020

(30) Foreign Application Priority Data
Mar. 12, 2019 (CA) .................. CA 3036452

(51) Int. Cl.
| | |
|---|---|
| *C09K 8/528* | (2006.01) |
| *C10G 75/02* | (2006.01) |
| *C09K 8/72* | (2006.01) |
| *C09K 8/86* | (2006.01) |
| *C09K 8/54* | (2006.01) |

(52) U.S. Cl.
CPC .............. *C09K 8/528* (2013.01); *C09K 8/54* (2013.01); *C09K 8/72* (2013.01); *C09K 8/86* (2013.01); *C10G 75/02* (2013.01); *C10G 2300/4075* (2013.01)

(58) Field of Classification Search
None
See application file for complete search history.

(56) References Cited

U.S. PATENT DOCUMENTS

| | | | | |
|---|---|---|---|---|
| 3,601,197 | A * | 8/1971 | Ayers | C09K 8/60 166/307 |
| 4,898,750 | A * | 2/1990 | Friedman | C08G 12/12 166/276 |
| 6,508,306 | B1 * | 1/2003 | Reddy | C09K 8/5083 166/293 |
| 2003/0230431 | A1 * | 12/2003 | Reddy | C09K 8/12 175/64 |
| 2004/0149431 | A1 * | 8/2004 | Wylie | E21B 33/138 166/242.1 |
| 2010/0167966 | A1 * | 7/2010 | Gutman | C09K 5/047 507/243 |
| 2016/0010217 | A1 * | 1/2016 | Hughes | C09K 8/54 427/409 |
| 2018/0244980 | A1 * | 8/2018 | Daeffler | C09K 8/602 |
| 2018/0244982 | A1 * | 8/2018 | Yakovlev | E21B 43/26 |

\* cited by examiner

*Primary Examiner* — John J Figueroa
(74) *Attorney, Agent, or Firm* — Sheridan Ross P.C.

(57) ABSTRACT

An organic acid composition for use in oil industry activities, said composition comprising an arylsulfonic acid in water as well as the use of said composition to perform various operations in the oil industry. There is also disclosed a solid acid composition comprising a corrosion inhibitor ready for dissolution and use.

14 Claims, 3 Drawing Sheets

A379

A706

A011

A010

ORGANIC ACID SYSTEMS

CROSS-REFERENCE TO RELATED APPLICATIONS

This application claims the benefit of Canada Patent Application No. 3,036,452 filed Mar. 12, 2019, the entire contents of which are incorporated herein by reference in its entirety.

FIELD OF THE INVENTION

This invention relates to a novel acid composition, more specifically a composition comprising an arylsulfonic acid for use in oil and gas operations.

BACKGROUND OF THE INVENTION

In the oil & gas industry, stimulation with an acid is performed on a well to increase or restore production. In many situations, various sizes of casing are placed in a well to prevent water table supply contamination, provide isolation between various formations to limit drilling fluid losses, contain high pressure formations, provide a means to secure down hole production equipment such as electric submersible pumps, pressure sensing equipment and isolation production strings etc. To secure these various lengths of casing, cement is utilized which typically is of a very high density and resistant to degradation by produced well fluids as well as conventional acids, such as hydrochloric acid. After the well is drilled, a completion program is typically commenced which will stimulate the formations or zones of interest to stimulate oil and gas fluids to flow from the formation into the wellbore. During these stimulations, fluids, gels, proppants, chemicals, and gases (such as nitrogen) will be pumped into the formation via the casing perforations (or other completion technique).

One of the challenges facing the industry is breaking down, or cleaning the residual cement and debris left in the perforations or breaking through the actual cement sheath in certain completion techniques such as cemented sleeve ports. During a cemented sleeve port completion operation, coiled tubing tools (or a shifting ball) will be deployed capable of "sliding open" the sleeve which is placed and cemented in position during the casing placement stage of the wells drilling cycle (at the end of the drilling cycle). Once these sleeves are opened there is typically a cement sheath inhibiting flow from the casing to the formation. Acids are typically deployed prior to the frac fluid stage (this acid stage is called a "spearhead"). Most cement blends commonly utilized in the oil & gas industry have minimal acid solubility, hindering the effectiveness of most conventional acids.

Another major challenge operators face is executing remedial (cement) work on existing wells for either the purpose of sealing a leak in the cement portion of the well (causing a communication of well fluids to an undesirable section of the formation or well face), or for an abandonment of a well whose life cycle has expired. In both of these examples, there is usually a need to seal any leaks that may be present by executing a "cement squeeze". Typically, an acid is pumped prior to the new cement to be placed to ensure an unobstructed pathway for the placement of the new cement to seal the leak or communication. In these situations, it is sometimes difficult to obtain an acceptable injection rate of the cement due to the inability of current acids typically used in the industry to solubilize the cement sufficiently.

Common day to day operations utilizing organic and mineral acids in the oil & gas industry include three major types of acid applications: matrix acidizing, fracture acidizing, and spearhead breakdown acidizing. A matrix acid treatment is performed when acid is pumped into the well and into the pores of the reservoir formation below the fracture pressure. In this form of acidization, the acids dissolve the sediments and mud solids that are inhibiting the permeability of the rock, enlarging the natural pores of the reservoir (wormholing) and stimulating flow of hydrocarbons. While matrix acidizing is done at a low enough pressure to keep from fracturing the reservoir rock, fracture acidizing involves pumping highly pressurized acid into the well, physically fracturing the reservoir rock and etching the permeability inhibitive sediments. This type of acid treatment forms channels or fractures through which the hydrocarbons can flow.

There are many different mineral and organic acids used to perform an acid treatment on wells. The most common type of mineral acid employed on wells to stimulate production is hydrochloric acid (HCl), which is useful in stimulating carbonate reservoirs.

One of the major challenges faced in the oil & gas industry from using hydrochloric acid is the extremely high levels of corrosion (which is countered by the addition of 'filming' corrosion inhibitors that are typically themselves toxic and harmful to humans, the environment and equipment, and are very difficult to maintain in solution with the acid over a period of time); reactions between acids and various types of metals can vary greatly but certain metals, such as aluminum and magnesium, are very susceptible to major effects causing immediate damage. Also, hydrochloric acid produces hydrogen chloride gas which is toxic (potentially fatal) and corrosive to skin, eyes and metals. At levels above 50 ppm (parts per million) it can be Immediately Dangerous to Life and Health (IDHL). At levels from 1300-2000 ppm death can occur in 2-3 minutes.

The inherent environmental effects (organic sterility, poisoning of wildlife etc.) of hydrochloric acids in the event of an unintended or accidental release on surface or downhole into water aquifers or other sources of water are devastating which can cause significant pH reduction of such and can substantially increase the toxicity and could potentially cause a mass culling of aquatic species and potential poisoning of humans or livestock and wildlife exposed to/or drinking the water. An unintended release at surface can also cause a hydrogen chloride gas cloud to be released, potentially endangering human and animal health. This is a common event at large storage sites when tanks split or leak. Typically, if near the public, large areas need to be evacuated post event. Because of its acidic nature, hydrogen chloride gas is also corrosive, particularly in the presence of moisture.

The inability for conventional acids and blends of such to biodegrade naturally without neutralizing the soil results in expensive cleanup-reclamation costs for the operator should an unintended release occur. Moreover, the toxic fumes produced by mineral & many organic acids (acetic and formic in particular) are harmful to humans/animals and are highly corrosive and/or explosive potentially. Transportation and storage requirements for these acids are quite restrictive and taxing in such that you must typically haul the products in specialized acid tankers or intermediate bulk containers (IBC) that are rated to handle such corrosive products, bringing exposure dangers for personnel exposed to handling.

Another concern is the potential for spills on locations due to the high corrosion levels of conventional acids which can cause storage container failures and/or deployment equipment failures i.e. coiled tubing or fracturing iron failures caused from high corrosion rates (pitting, cracks, pinholes, and major failures). Other concerns include: downhole equipment corrosion causing the operator to have to execute a work-over and replace down hole pumps, tubing, cables, packers etc.; high levels of corrosion on surface pumping equipment resulting in expensive repair and maintenance levels for operators and service companies; the requirement of specialized equipment that is purpose built to pump acids greatly increasing the capital expenditures of operators and service companies; and the inability to source a blended product locally or very near its end use.

Another problem for industry utilizing conventional acids, and certain acid replacements is high temperature stability. Several operations in the oil industry expose fluids and equipment to very high temperatures (some upward of 200° C.). The compositions used in these various operations need to withstand these high temperatures without losing their effectiveness. These compositions must be capable of being used in operations over a wide range of temperatures while not affecting the equipment with which it comes in contact and yet still remain stable. The current invention has stability up to 165 degrees Celsius and will not lose its solubilizing characteristics as temperature increases as many mineral acids do. Having a high temperature, chemically stable, acid is very attractive to industry for multiple functions such as, but not limited to, acid fracturing, remedial operations, freeing stuck drilling pipe, spearhead acids, high temperature scale mitigation, and constant injection applications for SAGD (Steam Assisted Gravity Drainage) programs.

When used to treat scaling issues on surface due to water/fluid precipitation, acids are exposed to personnel and mechanical devices as well as expensive pumping equipment causing increased risk for the operator and corrosion effects that damage equipment and create hazardous fumes. Conventional acids typically need to be blended with fresh water (due to their intolerance of highly saline water, causing precipitation of minerals) to the desired concentration requiring companies to pre-blend off-site as opposed to blending on-site with produced water thereby increasing costs associated with transportation.

When using an acid to pickle tubing or pipe, very careful attention must be paid to the process due to high levels of corrosion, as temperatures increase, the typical additives used to control corrosion levels in acid systems begin to degrade very quickly (due to the inhibitors "plating out" on the steel) causing the acids to become very corrosive and resulting in damage to equipment/wells. Having to deal with 'live' acid during the back flush process is also very expensive as conventional acids typically are still at a very low pH and toxic. It is advantageous to have an acid blend that can be exported to production facilities through pipelines that once spent or applied, is commonly a neutral pH greatly reducing disposal costs/fees.

Typically, up to 10 chemical additives can be required to control various aspects of the acids performance adding to obstacles in the handling and shipping logistics. Having an alternative that only requires minimal additives is very advantageous.

In wells that have a high degree of sour gas (hydrogen sulfide) and carbon dioxide, in its composition, there is always a high concern of corrosion. Pipelines are especially of concern, as many variables can create unwanted corrosion and pitting attack on the steels. Any presence of water containing hydrogen sulfide in combination with a certain amount of chlorides will create an acidic effect on the steel, potentially creating corrosion related failures. Any amount of protective scaling mechanism that is generated on the sour gas pipeline walls can also be subject to scale disruption in the presence of chlorides, exposing the surface to corrosion attack. The use of a hydrochloric acid in these types of applications is obviously not possible, due to the high level of chlorides in the mineral acid. Utilizing a high strength acid for downhole scale removal that has virtually no chloride level is an obvious advantage to the application.

As seen above, acids perform many actions in the oil & gas industry and are considered necessary to achieve the desired production of various petroleum wells, maintain their respective systems and aid in certain functions (i.e. remedial well intervention, or abandonment of a well that has expired its life cycle). The associated dangers that come with using acids are expansive and tasking to mitigate through controls, whether they are chemically or mechanically engineered. Eliminating or even simply reducing negative effects of acids while maintaining their usefulness is a struggle for the industry, especially at higher temperatures encountered downhole. As the public demand for the use of cleaner/safer/greener products increases, companies are looking for alternatives that perform the required function without all, or most of the drawbacks associated with the use of conventional acids.

Pitting corrosion is a very dangerous form of acid corrosion which is found more commonly in the use of organic acids rather than mineral acids. Pitting corrosion cause an overall mass loss (lb/ft$^2$ or mm/year) to be quite low, but due to the focused corrosion at a few spots there is a creation of weak points in the metal. These weak points, caused by the pits, can lead to a catastrophic material failure.

Consequently, there is still a need for compositions for use in the oil industry which can be used over a range of applications which can decrease a number of the associated dangers/issues typically associated with acid applications to the extent that these acid compositions are considered much safer for handling on worksites, stable at higher temperatures, and/or are chloride free in composition. Accordingly, there still exists a need for an acidic composition capable of overcoming at least some drawbacks from the prior art.

SUMMARY OF THE INVENTION

Therefore, the present invention provides for compositions which can ideally be used in various oilfield operations; spearhead acid, fracking operations, injection/disposal well injectivity treatments, scale treatments (surface and subsurface-wells equipment, pipelines, facilities), filter cake removal, tubing pickling, bullhead/annular squeezes and soaks, cement squeezes, fluids pH control, stuck pipe treatment. Preferred compositions of the present invention provide substantially less fuming than conventional acids eliminating or at least significantly reducing this risk for industry personnel.

The novel organic acid composition according to the present invention provides enhanced stability at high temperatures (up to 165° C.) compared to several commercially available acids.

According to another preferred embodiment of the present invention, there is provided a novel organic acid composition for use in the oil industry which is non-fuming, non-toxic, and has a highly controlled manufacturing process ensuring consistent end product strength.

According to another aspect of the present invention, there is provided a novel organic acid composition for use in the oil industry which has a pH below 1. Preferred compositions according to the present invention can be utilized in common day to day operations utilizing organic and mineral acids in the oil & gas industry which operations are selected from the group consisting of: matrix acidizing, fracture acidizing, and spearhead breakdown acidizing.

According to another aspect of the present invention, there is provided a novel organic acid composition that is stable at high temperatures (>160° C.) and yields reduced pitting corrosion.

Preferably, the novel organic acid composition that has a high solubilizing effect on high strength cements commonly utilized down hole in the oil & gas industry.

According to another aspect of the present invention, there is provided an organic acid composition for use in oil industry activities, said composition comprising an arylsulfonic acid in water.

Preferably, the arylsulfonic acid is toluenesulphonic acid. Preferably also, the organic acid composition, further comprises:
 a metal iodide or iodate; and
 an alcohol or derivative thereof.

Preferably, the metal iodide or iodate is selected from the group consisting of: cuprous iodide; potassium iodide; sodium iodide; and lithium iodide.

Preferably, the alcohol or derivative thereof is an alkynyl alcohol or derivative thereof. Preferably, the alkynyl alcohol or derivative thereof is propargyl alcohol or a derivative thereof. Preferably also, the alkynyl alcohol or derivative thereof is present in a concentration ranging from 0.05 to 1.0% w/w.

According to a preferred embodiment of the present invention, the alkynyl alcohol or derivative thereof is present in a concentration of 0.25% w/w.

According to a preferred embodiment of the present invention, the metal iodide is present in a concentration ranging from 100 to 5000 ppm. Preferably, the metal iodide is present in a concentration of approximately 1000 ppm.

According to another aspect of the present invention, there is provided a method of treating an acid with a corrosion inhibitor composition, wherein said method comprises:
 providing an acid in solid form;
 providing a liquid corrosion inhibitor composition;
 applying the liquid corrosion inhibitor composition onto the acid;
 allowing the resulting composition to dry; and
 dissolving in an appropriate medium the resulting acid-corrosion inhibitor composition to a pre-determined concentration.

According to another aspect of the present invention, there is provided a method of treating an acid with a corrosion inhibitor composition, wherein said method comprises:
 providing toluenesulfonic acid in solid form;
 providing a liquid corrosion inhibitor composition;
 applying the liquid corrosion inhibitor composition onto the acid;
 allowing the resulting composition to dry; and
 optionally, dissolving in an appropriate medium the resulting acid-corrosion inhibitor composition to a pre-determined concentration.

Preferably, the corrosion inhibitor composition comprises:
 a terpene;
 a propargyl alcohol or derivative thereof;
 at least one amphoteric surfactant; and
 a solvent.

According to another aspect of the present invention, there is provided an organic acid composition comprising an arylsulfonic acid in water, wherein the arylsulfonic acid is present in a concentration ranging from 1 to 99 wt %. Preferably, the arylsulfonic acid is present in a concentration ranging from 1 to 50 wt %.

More preferably, the arylsulfonic acid is present in a concentration ranging from 10 to 40 wt %.

According to another aspect of the present invention, there is provided a use of a corrosion inhibitor package with an acidic composition where the acidic composition comprises an acid selected from the group consisting of unsaturated organic acids and said corrosion inhibitor package comprising:
 a terpene;
 a propargyl alcohol or derivative thereof
 at least one amphoteric surfactant; and
 a solvent.

Preferably, the at least one amphoteric surfactant is selected from the group consisting of:
 a sultaine surfactant and a betaine surfactant; and combinations thereof. Preferably, the CI further comprises an anionic surfactant.

According to an aspect of the present invention, there is provided an organic acid composition for use in oil industry activities, said composition comprising: an arylsufonic acid; a metal iodide or iodate; and an alcohol or derivative thereof. Preferably, the arylsufonic is toluenesulfonic acid.

According to a preferred embodiment of the present invention, there is provided a use of an arylsulfonic acid composition in the oil industry to stimulate formations.

According to a preferred embodiment of the present invention, there is provided a use of an arylsulfonic acid composition in the oil industry to assist in reducing breakdown pressures during downhole pumping operations.

According to a preferred embodiment of the present invention, there is provided a use of an arylsulfonic acid composition in the oil industry to treat wellbore filter cake post drilling operations.

According to a preferred embodiment of the present invention, there is provided a use of an arylsulfonic acid in the oil industry to assist in freeing stuck pipe.

According to a preferred embodiment of the present invention, there is provided a use of an arylsulfonic acid composition in the oil industry to fracture wells.

According to a preferred embodiment of the present invention, there is provided a use of an arylsulfonic acid composition in the oil industry to complete matrix stimulations.

According to a preferred embodiment of the present invention, there is provided a use of an arylsulfonic acid composition in the oil industry to conduct annular and bullhead squeezes & soaks.

According to a preferred embodiment of the present invention, there is provided a use of an arylsulfonic acid composition in the oil industry to pickle tubing, pipe and/or coiled tubing.

According to a preferred embodiment of the present invention, there is provided a use of an arylsulfonic acid composition in the oil industry to increase effective permeability of formations.

According to a preferred embodiment of the present invention, there is provided a corrosion inhibitor for use with an arylsulfonic acid composition in the oil industry to reduce or remove wellbore damage.

According to a preferred embodiment of the present invention, there is provided a use of an organic acid composition in the oil industry to clean perforations.

According to a preferred embodiment of the present invention, there is provided a use of an organic acid composition in the oil industry to solubilize limestone, dolomite, calcite, and combinations thereof.

BRIEF DESCRIPTION OF THE FIGURES

The invention may be more completely understood in consideration of the following description of various embodiments of the invention in connection with the accompanying figures, in which.

DETAILED DESCRIPTION OF THE PREFERRED EMBODIMENTS

Figure 1:
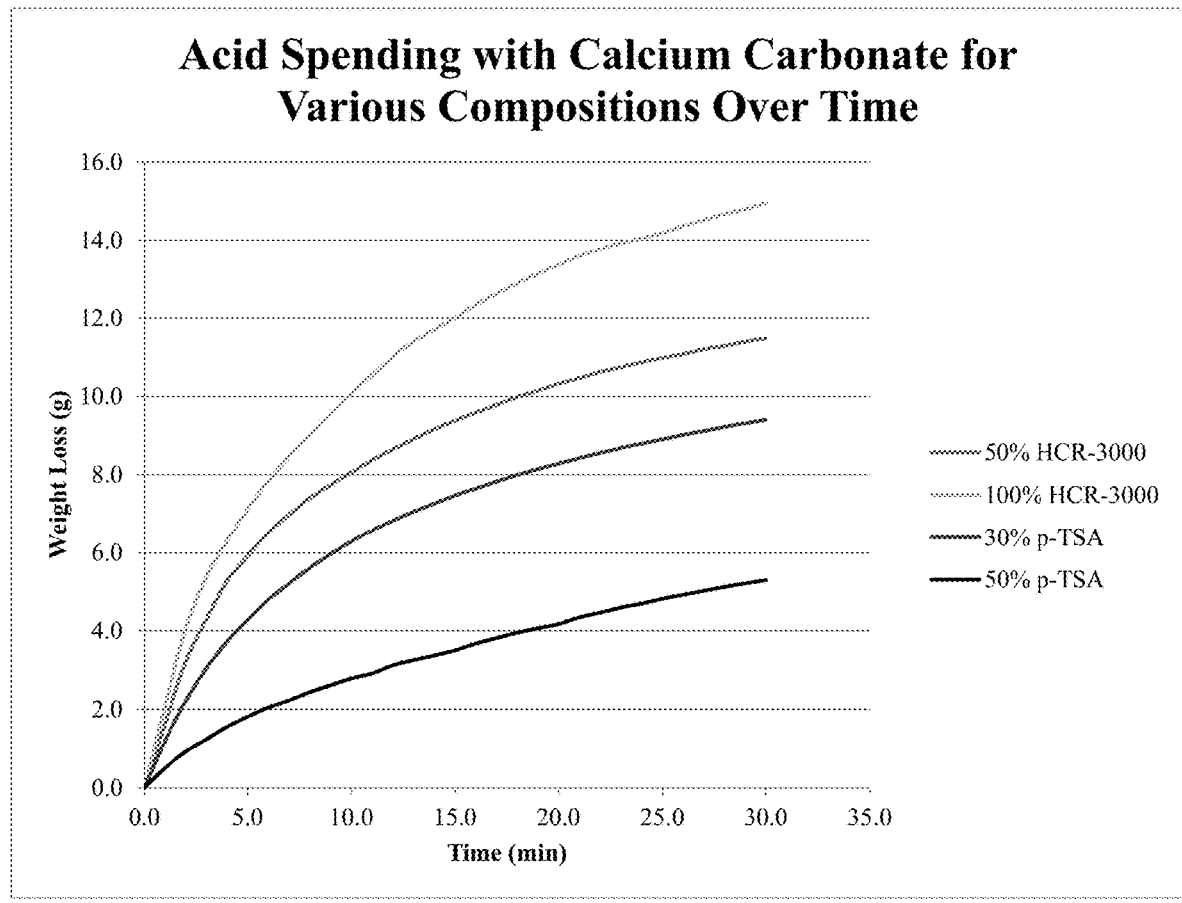
FIG. 1 is a graphical depiction of acid spending over time for various acid compositions.

It will be appreciated that numerous specific details have provided for a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered so that it may limit the scope of the embodiments described herein in any way, but rather as merely describing the implementation of the various embodiments described herein.

The description that follows, and the embodiments described therein, are provided by way of illustration of an example, or examples, of particular embodiments of the principles of the present invention. These examples are provided for the purposes of explanation, and not limitation, of those principles and of the invention.

Preferably the weight/volume % of the metal iodide or iodate in the acidic composition ranges from 0.01 to 1.5%. More preferably, the wt/vol. % of the metal iodide or iodate in the acidic composition ranges from 0.25 to 1.25%. Even more preferably, the wt/vol. % of the metal iodide or iodate liquid blends (with 10% iodide content) in the acidic composition is approximately 1%. Preferably, the metal iodide or iodate selected from the group consisting of: cuprous iodide; potassium iodide; sodium iodide; lithium iodide and combinations thereof. More preferably, the metal iodide is potassium iodide.

According to another aspect of the present invention, there is provided a use of an organic acid comprising an arylsulfonic acid according to a preferred embodiment of the present invention in the oil and gas industry to perform an activity selected from the group consisting of: stimulating formations; assisting in reducing breakdown pressures during downhole pumping operations; treating wellbore filter cake post drilling operations; assisting in freeing stuck pipe; descaling pipelines and/or production wells; increasing injectivity of injection wells; lowering the pH of a fluid; fracturing wells; performing matrix stimulations; conducting annular and bullhead squeezes & soaks; pickling tubing, pipe and/or coiled tubing; increasing effective permeability of formations; reducing or removing wellbore damage; cleaning perforations, nozzles, ports, jets etc.; solubilizing limestone, dolomite, and calcite; and removing undesirable scale from the group consisting of: equipment, cyclical steam wells, steam flood wells, SAGD (steam assisted gravity drainage) wells, unassisted or natural high formation temperature production wells, injection wells and their related surface and down-hole equipment and facilities at high temperatures.

One of the advantages of a preferred embodiment of the present invention is the ability to blend a corrosion inhibition package with the solid form of the acid. Doing so allows one to obtain the right CI loading for the acid all the while having a solid mixture which can be transported on site and mixed thereafter with the appropriate amount of water to obtain the desired strength. This is desirable as shipping costs are reduced and dilution of the solid acid can also permit to minimize risk associated with the handling and shipping of liquid acids.

Alcohols and derivatives thereof, such as alkyne alcohols and derivatives and more preferably 2-Propyn-1-ol complexed with methyloxirane can be used as corrosion inhibitors. Propargyl alcohol itself is traditionally used as a corrosion inhibitor which works extremely well at low concentrations. It is however a very toxic/flammable chemical to handle as a concentrate, so care must be taken while handling the concentrate. In the composition according to the present invention, 2-Propyn-1-ol complexed with methyloxirane is utilized where the toxic effect does not negatively impact the safety of the composition. There are derivatives of propargyl alcohol available in the industry now that are considered safe to handle, non-regulated, and approved for use in North Sea Offshore Oilfield applications. This is the preferred chemistry for the present composition. Preferably, the alkynyl alcohol or derivative thereof is present in a concentration ranging from 0.05 to 1.0% w/w. More preferably, the alkynyl alcohol or derivative thereof is present in a concentration of 0.25% w/w.

Metal iodides or iodates such as potassium iodide, sodium iodide, cuprous iodide, and lithium iodide can potentially be used as a corrosion inhibitor intensifier. In fact, potassium iodide is a metal iodide traditionally used as corrosion inhibitor intensifier, however it is expensive, but works extremely well. It is non-regulated, friendly to handle, and listed on the offshore PLONOR (Pose Little Or NO Risk) list as safe chemicals to the environment. According to a preferred embodiment of the present invention, the metal iodide or iodate is cuprous iodide. According to another preferred embodiment, the metal iodide or iodate is potassium iodide. According to another preferred embodiment, the metal iodide or iodate is sodium iodide. According to yet another preferred embodiment, the metal iodide or iodate is lithium iodide. According to a preferred embodiment of the present invention, the metal iodide is present in a concentration ranging from 100 to 5000 ppm. Preferably, the metal iodide is present in a concentration of 1000 ppm.

Preferably, according to a preferred embodiment of the present invention, there is provided a method to dry blend an acid with at least one corrosion inhibitor component so as to avoid having to blend such when dissolving said acid, presumably immediately prior to its use on site.

Example 1

Formulation and Process to Prepare a Composition According to a Preferred Embodiment of the Invention To prepare a composition according to a preferred embodiment of the present invention containing a 50 wt % p-TSA, one first weighs out 150 g of solid p-TSA into a beaker or flask. Then the solid is diluted with water up to a 250 ml mark. Start by combining the toluenesulfonic acid with the water and mix thoroughly for a few minutes until the solid is fully dissolved. Subsequently, if desired the additives can be added. For example, according to one embodiment, one adds 2-Propyn-1-ol, complexed with methyloxirane, and potassium iodide. Circulation is maintained until all products have been solubilized. Table 1 lists the components of the composition of Example 1, including their weight percentage as compared to the total weight of the composition and the CAS numbers of each component.

Similarly, to prepare a 30 wt % p-TSA composition, one takes 75 g solid p-TSA and places it in a beaker and then dilutes up to 250 mL with water. To make 1000 mL of a 50 wt % p-TSA composition one weighs 500 g of solid p-TSA and adds 620 ml of water. To make 1000 mL of a 30 wt % p-TSA composition, one weighs 300 g of solid p-TSA and adds 768 mL or water.

TABLE 1

Composition of an acid composition according to a preferred embodiment of the present invention

| Chemical | 30 Wt % Composition | 50 Wt % Composition |
| --- | --- | --- |
| Water | 72% | 55% |
| p-Toluenesulfonic Acid | 28% | 45% |

The resulting composition of Example 1 is a clear, odourless liquid having shelf-life of greater than 1 year. At 30 wt %, it has a specific gravity of 1.083±0.02. At 50 wt %, it has a specific gravity of 1.132±0.02. It is completely soluble in water and its pH is less than 1.

TABLE 2

Composition of a known acid composition used as a comparator

| Chemical | % Wt Composition |
| --- | --- |
| Water | 57.65% |
| Methanesulfonic Acid | 42% |
| 2-Propyn-1-ol, complexed with methyloxirane | 0.25% |
| Potassium Iodide | 0.01% |

Solubility Testing

To evaluate the solubilizing strength of preferred compositions according to the present invention, various strength compositions were tested at various temperatures on calcium carbonate and dolomite. The results are set out in Tables 3 (on calcium carbonate) and 4 (on dolomite).

TABLE 3

Results of the Acid Solubility test on Calcium Carbonate using a 30% or 50% p-TSA composition according to Example 1

| Fluid | Temp/ °C. | Acid Volume/ml | Initial Weight | Final Weight | Weight Loss/g | Total Solubility - kg/m$^3$ |
| --- | --- | --- | --- | --- | --- | --- |
| 50% p-TSA | 20 | 50 | 10.0 | 5.1 | 4.9 | 98.0 |
| 50% p-TSA | 55 | 50 | 10.0 | 4.7 | 5.3 | 106.0 |
| 50% p-TSA | 90 | 50 | 10.0 | 4.6 | 5.4 | 108.0 |
| 30% p-TSA | 20 | 50 | 10.0 | 7.17 | 2.8 | 56.0 |
| 30% p-TSA | 20 | 100 | 10.0 | 2.1 | 7.9 | 79.0 |

TABLE 4

Results of testing for the solubility of dolomite using a 30% or 50% p-TSA composition according to Example 1

| Fluid | Temp/ °C. | Acid Volume/ml | Initial Weight | Final Weight | Weight Loss/g | Total Solubility - kg/m$^3$ |
| --- | --- | --- | --- | --- | --- | --- |
| 50% p-TSA | 20 | 50 | 10.0204 | 9.9752 | 0.0452 | 0.9 |
| 30% p-TSA | 20 | 50 | 10.0037 | 10.0355 | −0.0318 | 0.0 |

Metal Scale Solubilizing Testing

To evaluate the metal solubilizing strength of preferred compositions according to the present invention, various strength compositions were tested at a temperature of 20° C. to determine their solubilizing strength on iron sulfide and zinc sulfide. Both metal sulfide represent possible scales found inside well bores during oil and gas operations. The ability of an acid to dissolve such scale will greatly contribute to minimizing well shut downs from reduced flow due to scaling issues. The solubility results are set out in Tables 5 (iron sulfide) and 6 (zinc sulfide).

TABLE 5

Acid solubility test results using a 30% or 50% p-TSA composition according to Example 1 with iron sulfide

| Fluid | Temperature/ ° C. | Acid Volume/ml | Initial Weight | Final Weight | Weight Loss/g | Total Solubility - $kg/m^3$ |
|---|---|---|---|---|---|---|
| 50% p-TSA | 20 | 50 | 10.0242 | 11.7331 | −1.7089 | 0.0 |
| 30% p-TSA | 20 | 50 | 10.0007 | 5.2489 | 4.7518 | 95.0 |

TABLE 6

Acid solubility test results using a 30% or 50% p-TSA composition according to Example 1 with zinc sulfide

| Fluid | Temperature/ ° C. | Acid Volume/ml | Initial Weight | Final Weight | Weight Loss/g | Total Solubility - $kg/m^3$ |
|---|---|---|---|---|---|---|
| 50% p-TSA | 20 | 50 | 3.0409 | 2.7214 | 0.3195 | 6.4 |
| 30% p-TSA | 20 | 50 | 5.0035 | 11.3276 | −6.3241 | 0.0 |

Corrosion Testing

Compositions according to the present invention were exposed to corrosion testing. Various steel grades were exposed to compositions according to the present invention for various exposure duration and temperatures. Depending on the intended use/application of an acidic fluid composition comprising a corrosion inhibitor package, a desirable result would be one where the $lb/ft^2$ corrosion number is at or below 0.05. A more desirable would be one where the corrosion (in $lb/ft^2$) is at or below 0.02. Where applicable the fluids (acid compositions) were diluted as indicated.

TABLE 7

Corrosion results on various metals exposed to a 50% p-TSA composition comprising various corrosion inhibitor packages (steel density = 7.86 g/cc) (at 90° C. and a pressure of 0 psi)

| Steel type | Duration (hour) | CI package | Total wt loss (g) | Surface area ($cm^2$) | Density (g/cc) | Mils/ year | Mm/ year | Lb/ $ft^2$ |
|---|---|---|---|---|---|---|---|---|
| J55 | 6 | 0.5% CI-5, 0.25% CI-1A, 0.1% NE-1 | 0.1191 | 30.129 | 7.86 | 289.083 | 7.343 | 0.008 |
| N80 | 6 | 0.5% CI-5, 0.25% CI-1A, 0.1% NE-1 | 0.2605 | 31.806 | 7.86 | 598.948 | 15.213 | 0.017 |
| QT-800 | 6 | 0.5% CI-5, 0.25% CI-1A, 0.1% NE-1 | 0.2916 | 30.129 | 7.86 | 707.781 | 17.978 | 0.020 |
| QT-100 | 6 | 0.5% CI-5, 0.25% CI-1A, 0.1% NE-1 | 0.2114 | 30.129 | 7.86 | 513.117 | 13.033 | 0.014 |

CI-1A refers to a 10% potassium iodide solution; CI-5 refers to a proprietary corrosion inhibitor package comprising a terpene; a cinnamaldehyde or a derivative thereof; at least one amphoteric surfactant; and a solvent.

TABLE 8

Corrosion results on various metals exposed to a 30% p-TSA composition comprising various corrosion inhibitor packages (steel density = 7.86 g/cc) (at 90° C. and a pressure of 0 psi)

| Steel type | Duration (hour) | CI package | Total wt loss (g) | Surface area (cm$^2$) | Density (g/cc) | Mils/ year | Mm/ year | Lb/ ft$^2$ |
|---|---|---|---|---|---|---|---|---|
| J55 | 6 | 1% CI-5CNE | 0.0806 | 30.129 | 7.86 | 195.635 | 4.969 | 0.005 |
| N80 | 6 | 1% CI-5CNE | 0.2955 | 31.806 | 7.86 | 679.421 | 17.257 | 0.019 |
| QT-800 | 6 | 1% CI-5CNE | 0.1599 | 30.129 | 7.86 | 388.115 | 9.858 | 0.011 |
| QT-100 | 6 | 1% CI-5CNE | 0.1314 | 30.129 | 7.86 | 318.938 | 8.101 | 0.009 |
| QT-900ss | 6 | 1% CI-5CNE (1 day aging) | 0.0808 | 16.632 | 7.86 | 355.269 | 9.024 | 0.010 |

CI-5CNE refers to a 10% potassium iodide solution, a proprietary corrosion inhibitor package comprising a terpene; a cinnamaldehyde or a derivative thereof; at least one amphoteric surfactant; and a solvent.

TABLE 9

Corrosion results on various metals exposed to a 50% p-TSA composition comprising various corrosion inhibitor packages (steel density = 7.86 g/cc) (at 55° C. and at a pressure of 0 psi)

| Steel type | Duration (hour) | CI package | Total wt loss (g) | Surface area (cm$^2$) | Density (g/cc) | Mils/ year | Mm/ year | Lb/ ft$^2$ |
|---|---|---|---|---|---|---|---|---|
| 1018CS | 168 | 0.5% CI-5, 0.25% CI-1A, 0.1% NE-1 | 0.1112 | 34.710 | 7.86 | 8.367 | 0.213 | 0.007 |
| A7075 | 168 | 0.5% CI-5, 0.25% CI-1A, 0.1% NE-1 | 0.7622 | 32.064 | 2.81 | 173.660 | 4.411 | 0.049 |

CI-1A refers to a 10% potassium iodide solution; CI-5 refers to a proprietary corrosion inhibitor package comprising a terpene; a cinnamaldehyde or a derivative thereof; at least one amphoteric surfactant; and a solvent.

TABLE 10

Corrosion results on various metals exposed to a 30% p-TSA composition comprising various corrosion inhibitor packages (steel density = 7.86 g/cc)(at 55° C. and at a pressure of 0 psi)

| Steel type | Duration (hour) | CI package | Total wt loss (g) | Surface area (cm$^2$) | Density (g/cc) | Mils/ year | Mm/ year | Lb/ ft$^2$ |
|---|---|---|---|---|---|---|---|---|
| 1018CS | 168 | 1% CI-5CNE | 0.2346 | 34.710 | 7.86 | 17.653 | 0.448 | 0.014 |
| A7075 | 168 | 1% CI-5CNE | 0.0533 | 32.064 | 2.81 | 12.144 | 0.308 | 0.003 |

CI-5CNE refers to a 10% potassium iodide solution, a proprietary corrosion inhibitor package comprising a terpene; a cinnamaldehyde or a derivative thereof; at least one amphoteric surfactant; and a solvent.

TABLE 11

Corrosion results on various metals exposed to a 50% p-TSA composition comprising various corrosion inhibitor packages (steel density = 7.86 g/cc) (at a pressure of 400 psi) for a duration of exposure of 6 hours

| Steel type | Temp (° C.) | CI package | Total wt loss (g) | Surface area (cm$^2$) | Mils/ year | Mm/ year | Lb/ ft$^2$ |
|---|---|---|---|---|---|---|---|
| J55 | 130 | 1.75% CI-5, 1.5% CI-1A, 0.1% NE-1 | 0.1647 | 30.129 | 399.765 | 10.154 | 0.011 |

TABLE 11-continued

Corrosion results on various metals exposed to a 50% p-TSA composition comprising various corrosion inhibitor packages (steel density = 7.86 g/cc) (at a pressure of 400 psi) for a duration of exposure of 6 hours

| Steel type | Temp (° C.) | CI package | Total wt loss (g) | Surface area (cm$^2$) | Mils/ year | Mm/ year | Lb/ ft$^2$ |
|---|---|---|---|---|---|---|---|
| N80 | 130 | 1.75% CI-5, 1.5% CI-1A, 0.1% NE-1 | 0.2933 | 31.806 | 674.363 | 17.129 | 0.019 |
| QT-800 | 130 | 1.75% CI-5, 1.5% CI-1A, 0.1% NE-1 | 0.4422 | 30.129 | 1073.322 | 27.262 | 0.030 |
| QT-100 | 130 | 1.75% CI-5, 1.5% CI-1A, 0.1% NE-1 | 0.2682 | 30.129 | 650.984 | 16.535 | 0.018 |

TABLE 12

Corrosion results on various metals exposed to a 30% p-TSA composition comprising various corrosion inhibitor packages (steel density = 7.86 g/cc for all steels other than super duplex with a density of 7.5g/cc) (at a pressure of 400 psi) for a duration of exposure of 6 hours

| Steel type | Temp (° C.) | CI package | Total wt loss (g) | Surface area (cm$^2$) | Mils/ year | Mm/ year | Lb/ ft$^2$ |
|---|---|---|---|---|---|---|---|
| J55 | 130 | 1% CI-5CNE | 0.1140 | 30.129 | 276.705 | 7.028 | 0.008 |
| N80 | 130 | 1.75% CI-5, 1.5% CI-1A, 0.1% NE-1 | 0.1532 | 31.806 | 352.241 | 8.947 | 0.010 |
| QT-800 | 130 | 1.75% CI-5, 1.5% CI-1A, 0.1% NE-1 | 0.1970 | 30.129 | 478.165 | 12.145 | 0.013 |
| QT-100 | 130 | 1% CI-5CNE | 0.1098 | 30.129 | 266.510 | 6.769 | 0.007 |
| P110 | 130 | 2% CI-5CNE | 0.0964 | 34.839 | 202.354 | 5.140 | 0.006 |
| Super Duplex 2507 | 130 | 2% CI-5CNE | 0.0293 | 34.710 | 62.609 | 1.590 | 0.002 |

TABLE 13

Corrosion results on various metals exposed to a 50% p-TSA composition comprising various corrosion inhibitor packages (steel density = 7.86 g/cc) (at a pressure of 0 psi and a temperature 90° C.) with a duration exposure of 6 hours and a coupon surface are of 34.710 cm$^2$

| Steel type | CI package | Wt loss (g) | Density (g/cm$^2$) | Mils/year | Mm/year | Lb/ft$^2$ |
|---|---|---|---|---|---|---|
| Super duplex 2507 | 0.75% CI-5, 0.5% CI-1A, 0.1% NE-1 | 0.0045 | 7.75 | 9.616 | 0.244 | 0.000 |
| duplex 2205 | 0.75% CI-5, 0.5% CI-1A, 0.1% NE-1 | 0.0247 | 7.70 | 53.122 | 1.349 | 0.001 |

TABLE 14

Corrosion results on various metals exposed to a 50% p-TSA (dry acid) composition comprising various corrosion inhibitor packages (steel density = 7.86 g/cc) (at a pressure of 400 psi and a temperature 150° C.) with a duration exposure of 6 hours

| Steel type | CI package | Wt loss (g) | Surface area (cm$^2$) | Mils/year | Mm/year | Lb/ft$^2$ |
|---|---|---|---|---|---|---|
| N80 | 1% CI- | 0.2064 | 31.806 | 474.560 | 12.054 | 0.013 |
| QT-800 | 1% CI- | 0.2104 | 30.129 | 510.690 | 12.972 | 0.014 |

With respect to the corrosion impact of the composition on typical oilfield grade steel, it was established that it was clearly well below the acceptable corrosion limits set by industry for various applications.

Corrosion Aging Testing

Additional corrosion testing was carried out to investigate the effect of aging the toluenesulfonic acid in solid form after the application of a liquid corrosion inhibitor composition onto the acid and the corrosiveness of various compositions according to preferred embodiments of the present invention. The results are listed in Tables 15 and 16. This is to examine the product shelf life and the results indicate that the compositions have excellent properties in terms of steel protection.

TABLE 15

Corrosion results (in lb/ft$^2$) on N80 metal exposed to a 30% p-TSA or 50% p-TSA composition at various temperature and days of aging corrosion inhibitor package in dry acid prior to dilution with water

| Days | Coupon | 30% p-TSA 90° C. | 30% p-TSA 150° C. | 50% p-TSA 90° C. | 50% p-TSA 150° C. |
|---|---|---|---|---|---|
| 1  | N80 | 0.019 | 0.028 | 0.010 | 0.016 |
| 5  | N80 | 0.017 | 0.047 | 0.005 | 0.014 |
| 14 | N80 | 0.015 | 0.034 | 0.007 | 0.009 |
| 60 | N80 | 0.010 | 0.023 | 0.006 | 0.014 |

TABLE 16

Corrosion results (in lb/ft$^2$) on QT-900 metal exposed to a 30% p-TSA or 50% p-TSA composition at various temperature and days of aging corrosion inhibitor package in dry acid prior to dilution with water

| Days | Coupon | 30% p-TSA 90° C. | 30% p-TSA 150° C. | 50% p-TSA 90° C. | 50% p-TSA 150° C. |
|---|---|---|---|---|---|
| 1  | QT-900 | 0.008 | 0.013 | 0.006 | 0.013 |
| 5  | QT-900 | 0.008 | 0.015 | 0.005 | 0.009 |
| 14 | QT-900 | 0.008 | 0.019 | 0.005 | 0.006 |
| 60 | QT-900 | 0.007 | 0.024 | 0.006 | 0.008 |

TABLE 17

Corrosion results on various metals exposed to a 50% p-TSA composition at various temperature for a 6 hour exposure time

| Temp (° C.) | Coupon | Serial# | Corrosion (lb/ft$^2$) | Observations |
|---|---|---|---|---|
| 90  | J55            | B622 | 0.008 | No Pits |
| 90  | N80            | A742 | 0.007 | No Pits |
| 90  | QT-800         | A378 | 0.008 | No Pits |
| 90  | QT-100         | A704 | 0.007 | No Pits |
| 130 | J55            | B623 | 0.011 | No Pits |
| 130 | N80            | A830 | 0.019 | No Pits |
| 130 | QT-800         | A379 | 0.030 | Pits |
| 130 | QT-100         | A706 | 0.018 | Pits |
| 90  | Super Duplex 2507 | A011 | 0 | No pits |
| 90  | Duplex 2205    | A010 | 0.001 | No pits |
| 150 | N80            | A838 | 0.013 | No pits |
| 150 | QT-800         | A376 | 0.014 | No pits |
| 150* | QT-900        | C266 | 0.013 | No pits |
| 130** | J55          | C115 | 0.008 | No pits |
| 150*** | N80         | A941 | 0.019 | No pits |

*refers to an experiment conducted with a 50% TSA concentration (with 1% CI-5CNE aged for a day)
*refers to an experiment conducted with a 30% TSA concentration (with 1% CI-5CNE)
*refers to an experiment conducted with a 30% TSA concentration (with 1% CI-5CNE aged for 387 days)

Figure 2:
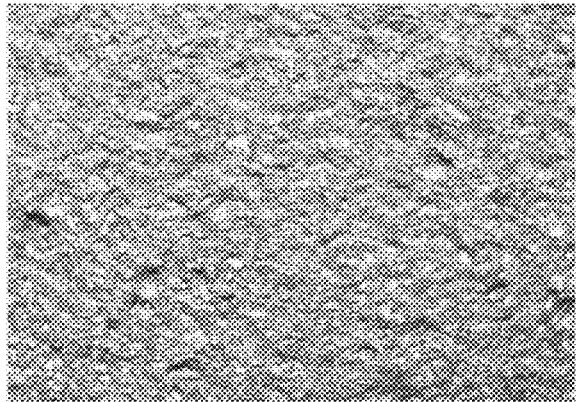
FIG. 2 contains a picture of the surface of 6 metal coupons (identified as B622, A742, A378, A704, B623 and A830) after exposure to acidic fluids as described in the description.
Figure 2:
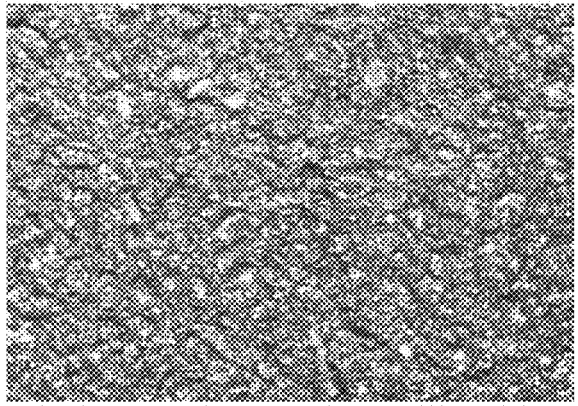
Figure 2:
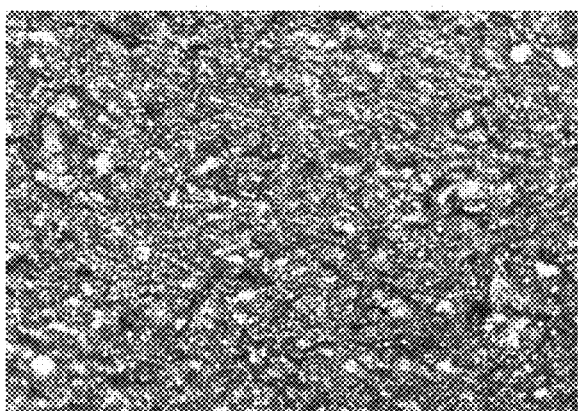
Figure 2:
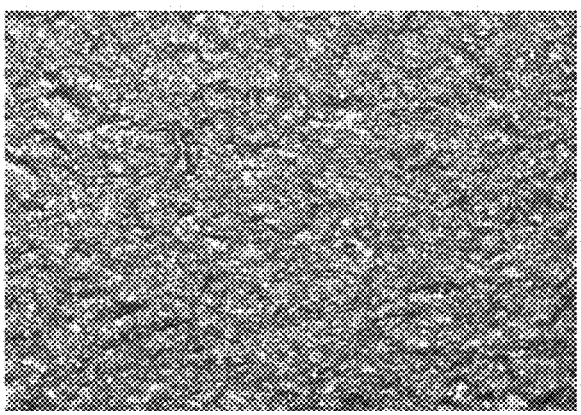
Figure 2:
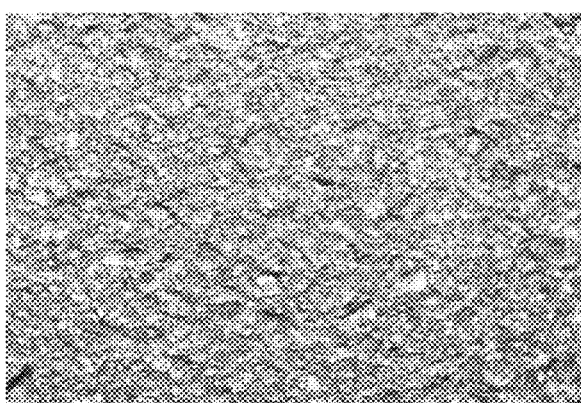
Figure 2:
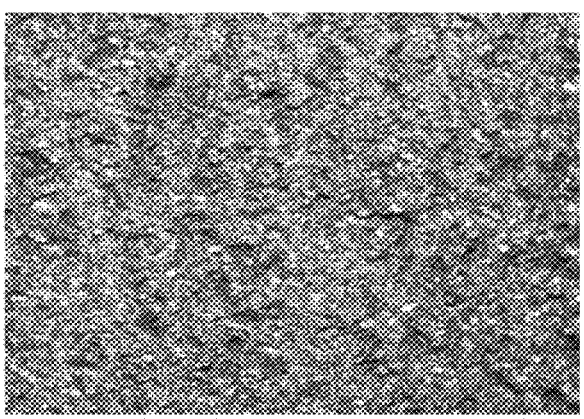
Figure 3:
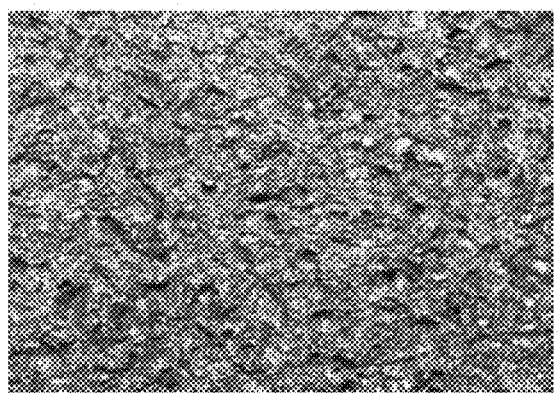
FIG. 3 contains a picture of the surface of 4 metal coupons (identified as A379, A706, A011 and A010) after exposure to acidic fluids as described in the description.
Figure 3:
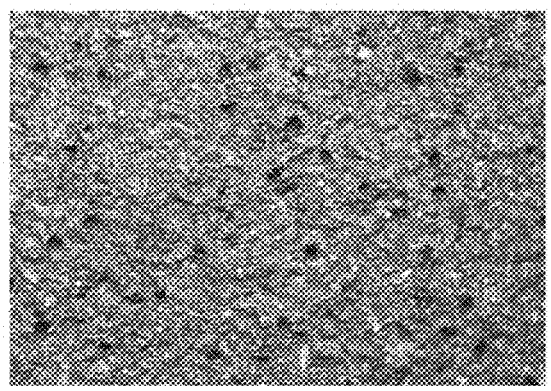
Figure 3:
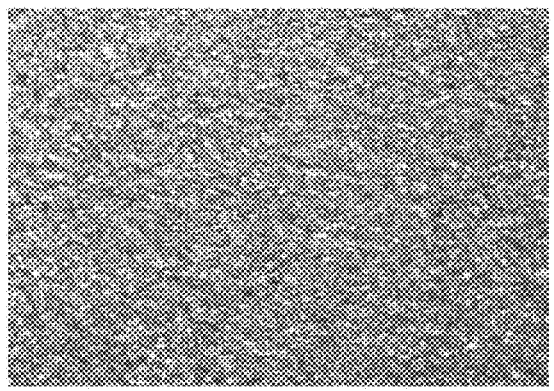
Figure 3:
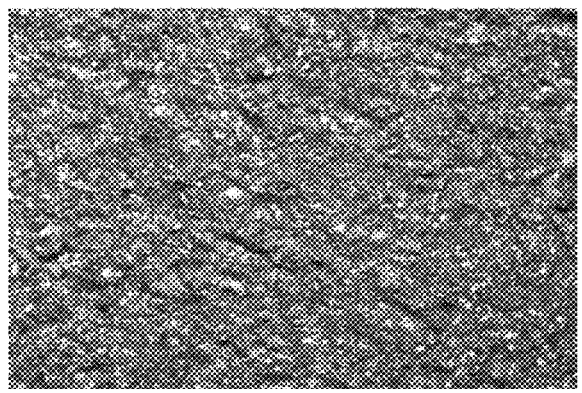

With respect to the corrosion impact of the composition on typical oilfield grade steel, it was established that it was clearly well below the acceptable corrosion limits set by industry for certain applications, such as spearhead applications or downhole scaling. Moreover, it was noted, upon visual inspection of the various coupons, that the p-TSA 50 wt % composition performed well in the prevention of pitting corrosion (see coupons photographs in FIGS. 2 and 3) on most metals at all temperature tested. Visual analysis of the coupons confirms that the compositions according to a preferred embodiment of the present invention preferable pitting corrosion profile when considering that pitting corrosion is the predominant problem in the use of alkylsulfonic acids such as methanesulfonic acid.

Elastomer Testing

When common sealing elements used in the oil and gas industry come in contact with acid compositions they tend to degrade or at least show signs of damage. A number of sealing elements common to the industry were exposed to a composition according to a preferred embodiment of the present invention to evaluate the impact of the latter on their integrity. More specifically, the hardening and drying and the loss of mechanical integrity of sealing elements can have substantial consequences to the operations of wells and result in undesirable shut downs to replace defective sealing elements. Testing was carried out to assess the impact of the exposure of composition of Example 1 to various elastomers. Long term (72-hour exposure) elastomer testing on the composition of Example 1 (at 50% dilution) at 70° C. showed little to no degradation of various elastomers, including Nitrile 70, Viton 75, and EPDM 70 style sealing elements.

TABLE 18

Elastomer Testing - Exposure of a composition according to the present invention (50% concentration) for 3 days @ 70° C.

| Elastomer | Weight before/g | Weight after/g | Weight Change/g | Thickness before/mm | Thickness after/mm | Thickness Change/mm |
|---|---|---|---|---|---|---|
| Viton V75 240 | 0.3447 | 0.3479 | −0.0032 | 3.54 | 3.56 | −0.02 |
| Nitrile N70 240 | 0.2468 | 0.2722 | −0.0254 | 3.43 | 3.60 | −0.17 |
| EPDM E70 126 | 0.1203 | 0.1255 | −0.0052 | 2.57 | 2.61 | −0.04 |

TABLE 19

Elastomer Testing - Exposure of a composition according to the present invention (50% concentration) for 3 days @ 20° C.

| Elastomer | Weight before/g | Weight after/g | Weight Change/g | Thickness before/mm | Thickness after/mm | Thickness Change/mm |
|---|---|---|---|---|---|---|
| Viton V75 240 | 0.3487 | 0.349 | −0.0003 | 3.53 | 3.53 | 0.00 |
| Nitrile N70 240 | 0.2497 | 0.2516 | −0.0019 | 3.40 | 3.46 | −0.06 |
| EPDM E70 126 | 0.135 | 0.1353 | −0.0003 | 2.63 | 2.63 | 0.00 |

TABLE 20

Elastomer Testing - Exposure of a composition according to the present invention (100% concentration) for 28 days @ 20° C.

| Elastomer | Weight before/g | Weight after/g | Weight Change/g | Thickness before/mm | Thickness after/mm | Thickness Change/mm |
|---|---|---|---|---|---|---|
| Viton V75 240 | 0.3268 | 0.328 | −0.0012 | 3.49 | 3.55 | −0.06 |
| Nitrile N70 240 | 0.2482 | 0.2545 | −0.0063 | 3.49 | 3.53 | −0.04 |
| EPDM E70 126 | 0.1232 | 0.1265 | −0.0033 | 2.54 | 2.59 | −0.05 |

TABLE 21

Elastomer Testing - Exposure of a composition according to the present invention (30% concentration) for 3 days @ 70° C.

| Elastomer | Weight before/g | Weight after/g | Weight Change/g | Thickness before/mm | Thickness after/mm | Thickness Change/mm |
|---|---|---|---|---|---|---|
| Viton V75 240 | 0.3312 | 0.3371 | −0.0059 | 3.57 | 3.58 | −0.01 |
| Nitrile N70 240 | 0.2276 | 0.2604 | −0.0328 | 3.52 | 3.63 | −0.11 |
| EPDM E70 126 | 0.1023 | 0.1092 | −0.0069 | 2.60 | 2.64 | −0.04 |

TABLE 22

Elastomer Testing - Exposure of a composition according to the present invention (30% concentration) for 3 days @ 20° C.

| Elastomer | Weight before/g | Weight after/g | Weight Change/g | Thickness before/mm | Thickness after/mm | Thickness Change/mm |
|---|---|---|---|---|---|---|
| Viton V75 240 | 0.3307 | 0.3311 | −0.0004 | 3.55 | 3.49 | 0.06 |
| Nitrile N70 240 | 0.2307 | 0.2325 | −0.0018 | 3.46 | 3.49 | −0.03 |
| EPDM E70 126 | 0.0995 | 0.1003 | −0.0008 | 2.57 | 2.60 | −0.03 |

TABLE 23

Elastomer Testing - Exposure of a composition according to the present invention (30% concentration) for 28 days @ 20° C.

| Elastomer | Weight before/g | Weight after/g | Weight Change/g | Thickness before/mm | Thickness after/mm | Thickness Change/mm |
|---|---|---|---|---|---|---|
| Viton V75 240 | 0.3525 | 0.3543 | −0.0018 | 3.51 | 3.46 | 0.05 |
| Nitrile N70 240 | 0.2239 | 0.2344 | −0.0105 | 3.49 | 3.50 | −0.01 |
| EPDM E70 126 | 0.0882 | 0.0930 | −0.0048 | 2.60 | 2.56 | 0.04 |

The uses (or applications) of the compositions according to the present invention upon dilution thereof ranging from approximately 1 to 75% dilution are listed in Table below, include, but are not limited to: injection/disposal in wells; squeezes and soaks or bullheads; acid fracturing, acid washes or matrix stimulations; fracturing spearheads (break-downs); pipeline scale treatments; cement breakdowns or perforation cleaning; pH control; and de-scaling applications.

TABLE 24

Various uses and suggested dilutions of the composition according to a preferred embodiment of the present invention

| Application | Suggested Dilution | Benefits |
| --- | --- | --- |
| Injection/ Disposal Wells | 50% | Compatible with mutual solvents and solvent blends, very cost effective. |
| Squeezes & Soaks Bullhead Annular | 33%-50% | Ease of storage & handling, cost effective compared to conventional acid stimulations. Ability to leave pump equipment in wellbore. |
| Acid Fracs | 50%-66% | Decreased shipping and storage compared to conventional acid, no blend separation issues, comprehensive spend rate encourages deeper formation penetration. |
| Frac Spearheads (Break-downs) | 33%-66% | Able to adjust concentrations on the fly. Decreased shipping and storage on location. |
| Cement Break-downs | 50% | Higher concentrations recommended due to lower temperatures, and reduced solubility of aged cement. |
| pH Control | 0.1%-1.0% | Used in a variety of applications to adjust pH level of water based systems. |
| Liner De-Scaling, Heavy Oil | 1%-5% | Continuous injection/de-scaling of slotted liners, typically at very high temperatures. |

While the foregoing invention has been described in some detail for purposes of clarity and understanding, it will be appreciated by those skilled in the relevant arts, once they have been made familiar with this disclosure that various changes in form and detail can be made without departing from the true scope of the invention in the appended claims.

What is claimed is:

1. A composition for use in oil industry activities, comprising an arylsulfonic acid in water and a corrosion inhibitor composition comprising: a terpene; a propargyl alcohol or a derivative thereof; at least one amphoteric surfactant; and a solvent.

2. The composition of claim 1, wherein the arylsulfonic acid is toluenesulfonic acid.

3. The composition of claim 1, further comprising a metal iodide or iodate.

4. The composition according to claim 1, further comprising a metal iodide present in a concentration ranging from 100 to 5000 ppm.

5. The composition according to claim 1, further comprising a metal iodide present in a concentration of 1000 ppm.

6. The composition according to claim 1, wherein the arylsulfonic acid is present in a concentration ranging from 1 to 99 wt %.

7. The composition according to claim 1, wherein the arylsulfonic acid is present in a concentration ranging from 1 to 50 wt %.

8. The composition according to claim 1, wherein the arylsulfonic acid is present in a concentration ranging from 10 to 40 wt %.

9. A method to prepare a solid form organic acid-inhibitor composition for use in oil industry activities, comprising:
providing an arylsulfonic acid in solid form;
providing a liquid corrosion inhibitor composition;
applying the liquid corrosion inhibitor composition on the arylsulfonic acid to form a mixture; and
drying the mixture to produce the solid form organic acid-inhibitor composition.

10. The method according to claim 9, wherein said arylsulfonic acid is toluenesulfonic acid.

11. The method according to claim 9, wherein the liquid corrosion inhibitor composition comprises:
a terpene;
a propargyl alcohol or a derivative thereof;
at least one amphoteric surfactant; and
a solvent.

12. The method according to claim 9, wherein the at least one corrosion inhibitor component is selected from the group consisting of: a terpene; a propargyl alcohol or a derivative thereof; at least one amphoteric surfactant; and a combination thereof.

13. A solid form organic acid composition for use in oil industry activities, comprising an arylsulfonic acid and a corrosion inhibitor component.

14. The solid form organic acid composition according to claim 13, wherein the corrosion inhibitor component is selected from the group consisting of: a terpene; a propargyl alcohol or a derivative thereof; at least one amphoteric surfactant; and a combination thereof.

* * * * *